(12) United States Patent
Kessler et al.

(10) Patent No.: US 10,955,823 B2
(45) Date of Patent: Mar. 23, 2021

(54) METHOD FOR THE DOSING OF CLEANING AGENTS

(71) Applicant: Henkel AG & Co. KGaA, Duesseldorf (DE)

(72) Inventors: Arnd Kessler, Monheim am Rhein (DE); Thomas Weber, Weimar (DE); Johannes Zipfel, Amsterdam (NL); Christian Nitsch, Duesseldorf (DE); Lars Zuechner, Langenfeld (DE); Nadine Franke, Cologne (DE); Georg Wawer, Vienna (AT); Alexander Mueller, Monheim (DE); Thomas Juckel, Monheim (DE); Clemens Arth, Graz (AT)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/470,361

(22) PCT Filed: Dec. 7, 2017

(86) PCT No.: PCT/EP2017/081855
§ 371 (c)(1),
(2) Date: Jun. 17, 2019

(87) PCT Pub. No.: WO2018/114362
PCT Pub. Date: Jun. 28, 2018

(65) Prior Publication Data
US 2019/0310612 A1 Oct. 10, 2019

(30) Foreign Application Priority Data

Dec. 21, 2016 (DE) ..................... 10 2016 225 828.1

(51) Int. Cl.
*G05B 19/4155* (2006.01)
*A47L 15/00* (2006.01)
(Continued)

(52) U.S. Cl.
CPC ........ *G05B 19/4155* (2013.01); *A47L 15/006* (2013.01); *A47L 15/0055* (2013.01);
(Continued)

(58) Field of Classification Search
CPC ...... G05B 19/4155; G05B 2219/35111; D06F 33/00; D06F 39/02; A47L 15/4463;
(Continued)

(56) References Cited

U.S. PATENT DOCUMENTS 9,336,385 B1 * 5/2016 Spencer .................. G06F 21/56
2010/0132748 A1 6/2010 Kessler et al.
(Continued)

FOREIGN PATENT DOCUMENTS

DE 102006038341 A1 2/2008
DE 102007014425 A1 9/2008
(Continued)

OTHER PUBLICATIONS

EPO, International Search Report and Written Opinion issued in International Application No. PCT/EP2017/081855, dated Mar. 19, 2018.

*Primary Examiner* — Ziaul Karim
(74) *Attorney, Agent, or Firm* — Lorenz & Kopf, LLP

(57) ABSTRACT

A method for the dosing of cleaning agents in cleaning machines includes the steps: receiving the control information items; wherein the control information items are dependent on an information item about a cleaning machine; determining the progress of a cleaning operation; dosing of cleaning agent depending on the received control information items and the determined progress of the cleaning (Continued)

operation; wherein the information item about the cleaning machine can be manually input via a user interface.

18 Claims, 8 Drawing Sheets

(51) Int. Cl.
    *A47L 15/44*       (2006.01)
    *C11D 17/04*       (2006.01)
    *D06F 39/02*       (2006.01)
    *D06F 33/00*       (2020.01)

(52) U.S. Cl.
    CPC ....... *A47L 15/0063* (2013.01); *A47L 15/4445* (2013.01); *A47L 15/4463* (2013.01); *C11D 17/046* (2013.01); *D06F 33/00* (2013.01); *D06F 39/02* (2013.01); *A47L 2301/08* (2013.01); *A47L 2401/03* (2013.01); *A47L 2401/04* (2013.01); *A47L 2401/10* (2013.01); *A47L 2401/11* (2013.01); *A47L 2401/12* (2013.01); *A47L 2401/34* (2013.01); *A47L 2501/07* (2013.01); *A47L 2501/26* (2013.01); *G05B 2219/35111* (2013.01)

(58) Field of Classification Search
    CPC ............... A47L 15/0055; A47L 15/006; A47L 15/0063; A47L 15/4445; A47L 2501/07; A47L 2401/04; A47L 2501/26; A47L 2401/12; A47L 2301/08; A47L 2401/03; A47L 2401/10; A47L 2401/11; A47L 2401/34; C11D 17/046
    See application file for complete search history.

(56) References Cited

U.S. PATENT DOCUMENTS

| | | | |
|---|---|---|---|
| 2011/0012749 | A1 | 1/2011 | Lonski |
| 2011/0180118 | A1* | 7/2011 | Schrott ................... D06F 34/22 134/56 D |
| 2014/0236328 | A1* | 8/2014 | Kamon ................... D06F 33/00 700/90 |
| 2016/0253651 | A1* | 9/2016 | Park ..................... G06Q 20/322 705/39 |
| 2020/0113405 | A1* | 4/2020 | Kessler ............... A47L 15/4463 |

FOREIGN PATENT DOCUMENTS

| | | |
|---|---|---|
| DE | 102008027280 A1 | 5/2009 |
| DE | 102008036586 A1 | 2/2010 |
| DE | 102014220353 A1 | 4/2016 |
| EP | 2277429 A2 | 1/2011 |
| EP | 3150757 A1 | 4/2017 |
| WO | 02077353 A1 | 10/2002 |
| WO | 2008019902 A1 | 2/2008 |

* cited by examiner

ABC

| Washing machines | Dryers | Dishwashers | Finishers | ... |
|---|---|---|---|---|
| 3220-... | 4610-... | 2210-... | 7701-... | ... |
| 3250-... | 4620-... | 2230-... | 7702-... | ... |
| 3270-... | 4630-... | 2250-... | 7703-... | ... |
| 3510-... | 4640-... | 2270-... | 7704-... | ... |
| ⋮ | ⋮ | ⋮ | ⋮ | ⋮ |

DEF

| Washing machines | Dryers | Dishwashers | Finishers | ... |
|---|---|---|---|---|
| 5210-... | 4410-... | 3210-... | 9701-... | ... |
| 5220-... | 4430-... | 3230-... | 9702-... | ... |
| 5230-... | 4440-... | 3250-... | 9703-... | ... |
| 5240-... | 4450-... | 3270-... | 9704-... | ... |
| ⋮ | ⋮ | ⋮ | ⋮ | ⋮ |

GHI

| Washing machines | Dryers | Dishwashers | Finishers | ... |
|---|---|---|---|---|
| 2120-... | 4210-... | 5110-... | 7711-... | ... |
| 2150-... | 4220-... | 5130-... | 7721-... | ... |
| 2170-... | 4230-... | 5150-... | 7731-... | ... |
| 2110-... | 4240-... | 5170-... | 7741-... | ... |
| ⋮ | ⋮ | ⋮ | ⋮ | ⋮ |

JKL

| Washing machines | Dryers | Dishwashers | Finishers | ... |
|---|---|---|---|---|
| 8720-... | 2310-... | 0210-... | 6101-... | ... |
| 8750-... | 2320-... | 0230-... | 6102-... | ... |
| 8770-... | 2330-... | 0250-... | 6103-... | ... |
| 8710-... | 2340-... | 0270-... | 6104-... | ... |
| ⋮ | ⋮ | ⋮ | ⋮ | ⋮ |

Fig.6a

ABC/
Washing machines

| Front loaders | Top loaders | A+++ | A++ | up to 1000 rev/min | up to 8 kg | ... |
|---|---|---|---|---|---|---|
| 3220-... | 4210-... | 6101-... | 9701-... | 5210-... | 8720-... | ... |
| 3250-... | 4220-... | 6102-... | 9702-... | 5220-... | 8750-... | ... |
| 3270-... | 4230-... | 6103-... | 9703-... | 5230-... | 8770-... | ... |
| 3510-... | 4240-... | 6104-... | 9704-... | 5240-... | 8710-... | ... |
| ⋮ | ⋮ | ⋮ | ⋮ | ⋮ | ⋮ | ⋮ |

Fig.6b

Washing machines

| ABC | DEF | GHI | JKL | ... |
|---|---|---|---|---|
| 3220-... | 4610-... | 2210-... | 7701-... | ... |
| 3250-... | 4620-... | 2230-... | 7702-... | ... |
| 3270-... | 4630-... | 2250-... | 7703-... | ... |
| 3510-... | 4640-... | 2270-... | 7704-... | ... |
| ⋮ | ⋮ | ⋮ | ⋮ | ⋮ |

Dryers

| ABC | DEF | GHI | JKL | ... |
|---|---|---|---|---|
| 5210-... | 4410-... | 3210-... | 9701-... | ... |
| 5220-... | 4430-... | 3230-... | 9702-... | ... |
| 5230-... | 4440-... | 3250-... | 9703-... | ... |
| 5240-... | 4450-... | 3270-... | 9704-... | ... |
| ⋮ | ⋮ | ⋮ | ⋮ | ⋮ |

Dishwashers

| ABC | DEF | GHI | JKL | ... |
|---|---|---|---|---|
| 2120-... | 4210-... | 5110-... | 7711-... | ... |
| 2150-... | 4220-... | 5130-... | 7721-... | ... |
| 2170-... | 4230-... | 5150-... | 7731-... | ... |
| 2110-... | 4240-... | 5170-... | 7741-... | ... |
| ⋮ | ⋮ | ⋮ | ⋮ | ⋮ |

Finishers

| ABC | DEF | GHI | JKL | ... |
|---|---|---|---|---|
| 8720-... | 2310-... | 0210-... | 6101-... | ... |
| 8750-... | 2320-... | 0230-... | 6102-... | ... |
| 8770-... | 2330-... | 0250-... | 6103-... | ... |
| 8710-... | 2340-... | 0270-... | 6104-... | ... |
| ⋮ | ⋮ | ⋮ | ⋮ | ⋮ |

Fig.7a

METHOD FOR THE DOSING OF CLEANING AGENTS

CROSS-REFERENCE TO RELATED APPLICATION

This application is a U.S. National-Stage entry under 35 U.S.C. § 371 based on International Application No. PCT/EP2017/081855, filed Dec. 7, 2017, which was published under PCT Article 21(2) and which claims priority to German Application No. 10 2016 225 828.1, filed Dec. 21, 2016, which are all hereby incorporated in their entirety by reference.

TECHNICAL FIELD

The present disclosure relates to a method and a device for the automatic dosing of cleaning agents in a cleaning machine.

BACKGROUND

One known problem in cleaning with the aid of cleaning machines relates to the dosing of the cleaning agents used, in particular with regard to the optimal time of delivery of the cleaning substance and the optimum amount. In this case, too low, as well as too high a dosage of cleaning agents leads to an unsatisfactory cleaning result. Unnecessarily high amounts of energy, cleaning agents and water are consumed in the case of too high a dosage, which not only increases the cost, but also additionally burdens the environment.

However, an accurate dosage of the cleaning agent is not trivial, since the correct dosage not only depends on the amount and degree of soiling of the objects to be cleaned, but also by other factors, such as the selected cleaning program, the type of soiling, the water hardness, the cleaning agent and any cleaning additives and the like.

To solve the problems mentioned, cleaning machines having automatic dosing systems are known in which, with the aid of a variety of sensors, a current cleaning state of items to be cleaned and a current operating state of a cleaning machine are identified and, depending on the determined states, dosed cleaning agent is delivered to the cleaning machines, so that a single cleaning operation preferably comprises a plurality of dosing operations.

However, because automatic dosing is also desired in cleaning operations using older cleaning machines, which generally have a service life of from about 15 to about 20 years, a universally applicable retrofit system, in particular a universally applicable mobile automatic dosing device has been proposed, in which dosed cleaning agent is also delivered to the cleaning machines depending on current cleaning states of the items to be cleaned and depending on determined current operating states of the cleaning machines.

A disadvantage of the proposed mobile automatic dosing device, however, is that this, in particular in ensuring the desired universal applicability, can only inaccurately determine an optimal time for the dosing of cleaning agent during a cleaning operation, being based only on data determined during a cleaning operation data, which finally leads to an optimal cleaning result not being able to be achieved. In particular, the accurate determination of the current operating states of a cleaning machine solely on the basis of data determined during a cleaning operation data is problematic in this case.

BRIEF SUMMARY

Against this background, it is thus an object to at least partially reduce or avoid the problems described, that is, to provide an optimum cleaning result with low consumption of energy, water and cleaning agent with the most universal applicability of the mobile dosing device.

This object is solved objectively by a method for the automatic dosing of cleaning agents according to claim 1, a mobile dosing device according to claim 10 and by a system according to claim 15.

It has been recognized herein that an optimal time for the dosing of cleaning agent during a cleaning operation can be determined very accurately in which, in addition to a current cleaning state of the items to be cleaned, a current operating state of a cleaning machine is also known.

Furthermore, it has been recognized herein that the operating state of a cleaning machine and thus with knowledge of a current cleaning state, the optimal time for a dosing of cleaning agent can also be determined very accurately, in which the dosing device receives control information items concerning the cleaning machine performing the cleaning operation before the beginning of a cleaning operation.

According to a first aspect, therefore, a method for the dosing of cleaning agents in cleaning machines is proposed, comprising the steps: receiving control information items, wherein the control information items are dependent on an information item about a cleaning machine; determining the progress of a cleaning operation; dosing of cleaning agent depending on the received control information items and the determined progress of the cleaning operation; wherein the information about the cleaning machine can be manually input via a user interface.

Cleaning agents are objectively understood as meaning not only laundry cleaning agents but also, in particular, fabric softeners, machine cleaners, dishwashing cleaning agents, water softeners, rinse aids, starches, vinegar cleaners, water deflectors, color catchers, bleaching agents, grayness inhibitors, color transfer inhibitors and biologically active systems and the like.

Cleaning machines can be understood objectively as meaning in particular household machines, such as washing machines, dishwashers, dryers, finishers and the like, but cleaning machines can also be understood as meaning large kitchen appliances or equipment from dry cleaning businesses.

In accordance with the present method for the dosing of cleaning agents in cleaning machines, in an embodiment control information items transmitted to a mobile dosing device are control information items concerning the program structure of the cleaning machine executing the cleaning operation, which cleaning machine can be used by the dosing device to be able to determine more accurately an operating state of a cleaning operation in a cleaning machine, whereby a time for the dosing of cleaning agent can also be determined more accurately, so that an improved cleaning result can be achieved.

The control information items may include the complete or substantially complete program sequence of a cleaning machine in all cleaning programs that can be performed with the cleaning machine. The program sequence is understood as meaning the sequence of most or all operations that can be executed during a program, which usually are individual for each type of cleaning machine.

A mobile dosing device for executing the present method in an embodiment has a communication unit including a communication interface configured to receive the control information item. The communication interface is formed as a wireless communication interface for a flexible, possibly also remote, reception of the control information item.

The control information items received by the dosing device via the communication unit are stored in a memory, for example in an external memory arranged remote from the dosing device. In an embodiment, the external storage is cloud-based and can be reached via a connection to the cloud. In an embodiment, the dosing device can receive the control information items directly from the external memory in this way. This allows a cloud-based handling of the stored data and thus, in addition to a simple exchange of information items, also a virtually universal access to the information items.

In addition to receiving the control information items stored in an external memory via a direct connection to the memory, the control information items can also be transmitted indirectly, for example, via an Internet service and can be received by the dosing device.

Alternatively, the memory can also be formed as an internal memory and arranged on the dosing device, for example integrated into the dosing device. Although this does not permit cloud-based access to the data, it also does not require a communication interface formed as a wireless interface.

According to a further embodiment of the present method for the dosing of cleaning agents in cleaning machines, the control information items may be transmitted wirelessly instead of directly from the memory, via a user, for example, with the aid of a user terminal, such as a smart phone, a tablet or a computer, to the mobile dosing device and be received by the dosing device.

In this case, the user terminal can establish a connection to the dosing device via an application and send the control information items wirelessly to the dosing device by WLAN, Bluetooth or mobile radio.

The user terminal can also be wirelessly connected to the memory to receive the information items subsequently forwarded to the dosing device from the memory or retrieve from the memory.

Since the received control information items according to the present method depend on an information item about a cleaning machine, the memory may first receive corresponding information items about a cleaning machine before selecting the corresponding control information items. The memory may receive this information item from the user herself/himself, in particular via a wireless connection via a user terminal.

The information item about a cleaning machine is a device-specific information item, for example an information item uniquely defining the cleaning machine, in particular a serial number.

Alternatively or cumulatively, the information item can also be a product number, type number, model number, service number, rack number and/or the like, with the aid of which the cleaning machine can be uniquely identified.

According to a further possible embodiment, the information item about a cleaning machine can also be an information item composed of one or more device-specific identifiers, which finally uniquely identifies the cleaning machine. For example, the type and/or the brand and/or the construction year and/or the series and/or the holding capacity and/or the loading capacity and/or the energy classification and/or the filling mode of the cleaning machine can be used as device-specific characteristics.

The information item about a cleaning machine or an information item composed of a plurality of device-specific identifiers is manually entered via a user interface according to the present method.

In this case, a user can select the information item about a cleaning machine according to an embodiment of the present method from a list of cleaning machines provided to the user. For example, the list is formed as a table which lists cleaning machines based on various criteria and allows the user to select his cleaning machine via a device-specific information item uniquely defining the corresponding machine or via an information item composed of a plurality of device-specific identifiers.

In an embodiment, the relevant information item about a cleaning machine is thereby stored together with the respective control information items in the memory, so that the user receives access to the control information items via a connection to the memory.

A connection of a user to the memory can be thereby produced for example via an application of a user terminal.

Alternatively, the user can receive at least one destination address of the memory for determining the control information items, for example, from the mobile dosing device. The mobile dosing device, for example, when it falls below a particular distance to the user terminal, can detect the presence of a user and the user can get a destination address of a memory after a connection setup, via which the user can establish a connection to the memory. After a connection has been established, the user can finally be provided with a list from the memory, from which list the user can select his cleaning machine on the basis of a device-specific information item uniquely defining the cleaning machine. As an alternative to receiving a destination address of the memory, the user can also be connected directly to the memory by the dosing device via a user terminal.

A dosing of cleaning agent is carried out according to the present method not only depending on the received control information items, but also on the basis of the determined progress of the cleaning operation.

The determination of the progress of the cleaning operation in this case is for example carried out via the detection of measured values by sensors, which may be combined in a sensor unit and arranged on the dosing device. The sensors integrated in the sensor unit of the dosing device can be any of a wide variety of types of sensors, which can detect different measured variables, so that a current cleaning state of items to be cleaned can be determined as accurately as possible.

Thus, for example, sensors for detecting measured variables of a cleaning fluid and sensors for measuring geometric, mechanical, dynamic, thermal or caloric measured variables or also sensors for measuring climatic, optical, acoustic, electrical chemical, biological or medical measured variables can be arranged.

In an exemplary implementation for processing the measured values detected by the sensor unit, the sensor information items can be collected and prepared for further use, wherein the dosing device then has a non-temporary memory to store the sensor information items recorded over time and to automatically make a decision about the suitable time and the addition of suitable different substances and in the absence of appropriate decision criteria or external further influences to implement a pre-defined sequence of addition of substances based on the decision and to perform a cleaning or treatment optimized to the circumstances.

A preparation of the sensor information items can also be used objectively to automatically identify the cleaning machine performing a cleaning operation, in which the movable dosing device may be connected indirectly to a database, a website or a service in a cloud via a wireless connection via a user terminal or directly via an integrated modem and via a data matching between the data prepared by the movable dosing device data and the data stored in the cloud, performs an identification of the cleaning machine executing the cleaning operation, so that a cleaning optimized to the circumstances can be performed.

In addition to the identification of the cleaning machine executing the cleaning operation based on a preparation of the sensor information items, via a continuous matching of the prepared sensor information items with the information items provided by a database, a website or a service in the cloud, an iterative process related to the individual washing can also be performed for adaptation and decision making of a suitable dosing time.

According to a further embodiment of the present method, a decision of a suitable dosing time can also be made via the inclusion of user experience values in which the user can preferably perform a manual parameterization of a cleaning operation via a user terminal.

In accordance with a further embodiment for improving the present method, a user profile may be created on the basis of the measured variables detected during a cleaning operation and the received control information items, which profile is for example stored on a nonvolatile memory arranged on the dosing device.

According to a further embodiment of the present method, the dosing device may have a completely autonomous, self-learning algorithm, which over time uses both the information items prepared by the dosing device and related to the individual washing operation, and the information items additionally accessible from a memory or stored in a user profile, to learn a decision-making about the appropriate time and the addition of suitable different cleaning substances in order to perform a cleaning optimized to the circumstances relating to energy, cleaning, noise or any other type.

According to a second aspect of the present disclosure, a mobile dosing device is provided for the automatic dosing of cleaning agents in a cleaning machine, including: at least one dosage chamber; at least one sensor unit configured to detect measured variables; at least one control unit configured to control the mobile dosing device; at least one communication unit configured to receive control information items, wherein the control information items are dependent on an information item about the cleaning machine that can be manually input via a user interface; wherein the dosing device is configured such that a dosed supply of cleaning agent is carried out depending on the received control information items and the determined progress of the cleaning operation.

The sensor unit of the mobile dosing device may include a number of different sensors which are able to determine a current cleaning state of items to be cleaned during a cleaning operation, so that on this basis, among other things, an optimal dosage of cleaning agent can be made.

For this purpose, the sensor unit may have at least one sensor for detecting the state of a cleaning fluid, in particular at least one sensor for measuring viscosity, turbidity, pollen load, water hardness, color rinse, pH value or odor.

In addition, in order to ensure the determination of an optimal dosage of cleaning agent, at least one sensor for measuring one of the following measured variables may be arranged on the dosing device and/or the cleaning machine: geometric measured variables; mechanical measured variables; dynamic measured variables; thermal and caloric measured variables; climatic measured variables; optical measured variables; acoustic measured variables; electrical measured variables; chemical, biological or medical measured variables.

In addition, for a more accurate determination of a soiling state of the items to be cleaned, the sensor unit may have at least one miniature or microcamera for detecting a state of a items to be cleaned.

The control unit of the present dosing device may be configured to control the dosing of the dosing device on the basis of the measured values determined by the sensor unit and on the basis of the control information item obtained. In addition, the control unit is also able to make the dosing of cleaning agent dependent on other information items such as user experience values and user profiles and the like, wherein the control unit performs a dosage of cleaning agent, in particular after a successful communication with the communication unit.

According to an embodiment, the communication unit of the present dosing device is formed as a wireless communication unit, configured for wireless communication, in particular via WLAN, Bluetooth, Zigbee, NFC, Wibree, WiMAX, measurable networks, IrDA or optical directional radio. For example, the mobile dosing device can thus be in contact with a user, a storage, a cloud-based service and the like, despite its arrangement within a cleaning machine.

In addition to the possibility of wireless communication of the dosing device with a user, a memory, a cloud-based service and the like, the wireless communication unit also offers the possibility of wireless communication of the dosing device with other cleaning machines within a private or public network.

For a more optimal dosage, the mobile dosing device may have a plurality of dosage chambers, which are formed as a structural unit. The dosage chambers can be filled via separate refill openings with the desired cleaning agent before a cleaning operation. The refill openings may be large enough that they can be easily filled via these, and a possible rinsing operation can be carried out. The fact that the dosing device can be easily cleaned, one and the same dosage chamber can be filled with various cleaning agents after flushing. This allows, in particular, a use of a dosing device in different cleaning machines.

In order to ensure optimum dosing, the mobile dosing device, in particular the feed unit of the dosing device, may have at least one electrical valve and the associated control electronics. In an embodiment, the mobile dosing device has a dosing valve for each dosage chamber. These may be electrically controlled valves. Alternatively, the valves can also be pneumatically or magnetically controlled.

The mobile dosing device may also have an autonomous energy conversion system for the necessary energy supply. Alternatively, another energy conversion system can be arranged on mobile dosing device, which converts, for example, kinetic energy or heat energy into electrical energy. In addition, alternatively or cumulatively, a mobile power supply unit may be arranged on the mobile dosing device for an autonomous energy conversion system, for example in the form of batteries or accumulators, so that the supply of the mobile dosing device with electrical energy is ensured at all times.

Alternatively, the mobile dosing device can also have a device for inductive and non-contact transmission of electrical energy, so that the mobile dosing device can be fed electrically without contact by induction. The mobile dosing device may therefore have at least one coil in which a current can be induced via a magnetic and/or electric field.

In order to be able to determine the respective fill levels of the cleaning agents in preferably each dosage chamber, the mobile dosing device may have a measuring device for measuring a fill level, in particular an absolute fill level, in each dosage chamber. In order to obtain a continuous overview about the fill levels of the cleaning agents, the measurement of the fill level can be carried out continuously, for example via a mechanical, a capacitive or an optical measurement method. Alternatively, a fill level measurement can also be carried out via a conductivity, ultrasound or microwave method.

In an energy-saving alternative to the continuous measurement of the fill levels, the fill level of the dosage chambers can also only be determined at particular intervals or only above particular limits by employing fill level limit switches.

In order to be able to display the measured fill levels of the cleaning agents or to be able to warn if necessary when low fill levels are reached, the mobile dosing device may be suitable for sending a notification about current fill levels.

In addition to current fill levels, the mobile dosing device can also forward information items about any errors in a rinsing or washing chamber, such as carbonization of contacts, jamming of valves or discharges of batteries.

According to a further embodiment, a computer program is described which includes program instructions which cause a processor to execute and/or control a present method when the computer program is running on the processor.

In addition, an exemplary computer-readable storage medium is described which contains an exemplary computer program.

There is further described, in accordance with a third aspect, an exemplary system comprising the mobile dosing device, a user terminal, and a memory, which together are configured to perform an exemplary present method.

The exemplary embodiments of the present disclosure described above in this description are also to be understood as being disclosed in all combinations with one another. In particular, exemplary embodiments are to be understood in terms of the different aspects disclosed.

In particular, the preceding or following description of method steps according to embodiments of a method also discloses corresponding means for performing the method steps by preferred embodiments of a device. Likewise, by the disclosure of means of a device for performing a method step, the corresponding method step is also disclosed.

BRIEF DESCRIPTION OF THE DRAWINGS

Further exemplary embodiments as contemplated herein can be found in the following detailed description of the present disclosure, in particular in conjunction with the figures. However, the figures should only serve the purpose of clarification, not, however, to determine the scope of protection of the present disclosure. The figures are not to scale and are merely intended to exemplify the general concept of the present disclosure. In particular, features included in the figures should by no means be considered as a necessary component of the present disclosure.

In particular, the present disclosure will hereinafter be described in conjunction with the following drawing figures, wherein like numerals denote like elements, and wherein:

FIG. 6a shows an example of a first level of a selection table for selecting a machine type of a cleaning machine according to a first embodiment;

FIG. 6b shows the table of FIG. 6a in a second level;

FIG. 7a shows an example of a selection table for selecting a machine type of a cleaning machine according to a second embodiment;

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

Figure 1:
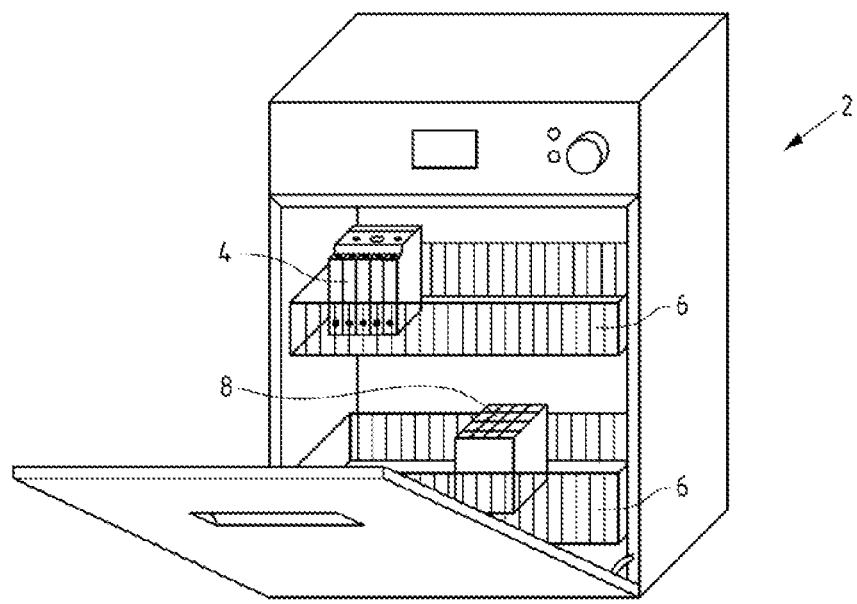
FIG. 1 shows a mobile dosing device for the automatic dosing of cleaning agents according to a first embodiment, arranged in the treatment space of a dishwasher.

FIG. 1 shows a mobile dosing device 4 for the automatic dosing of cleaning agents according to a first exemplary embodiment, arranged in the treatment space of a dishwasher 2.

In the case of an arrangement of the dosing device 4 within a dishwasher 2, the device may be designed to be robust against the mechanical and chemical influences acting during the respective cleaning operations.

The dosing device 4 arranged in one of the baskets 6 of the dishwasher 2 according to FIG. 1 may have a built-in autonomous power supply 24 and can alternatively also be arranged in the cutlery basket 8 or in another embodiment also in a cutlery drawer or in or on a storage tank for cleaning agent of the dishwasher 2.

Figure 2:
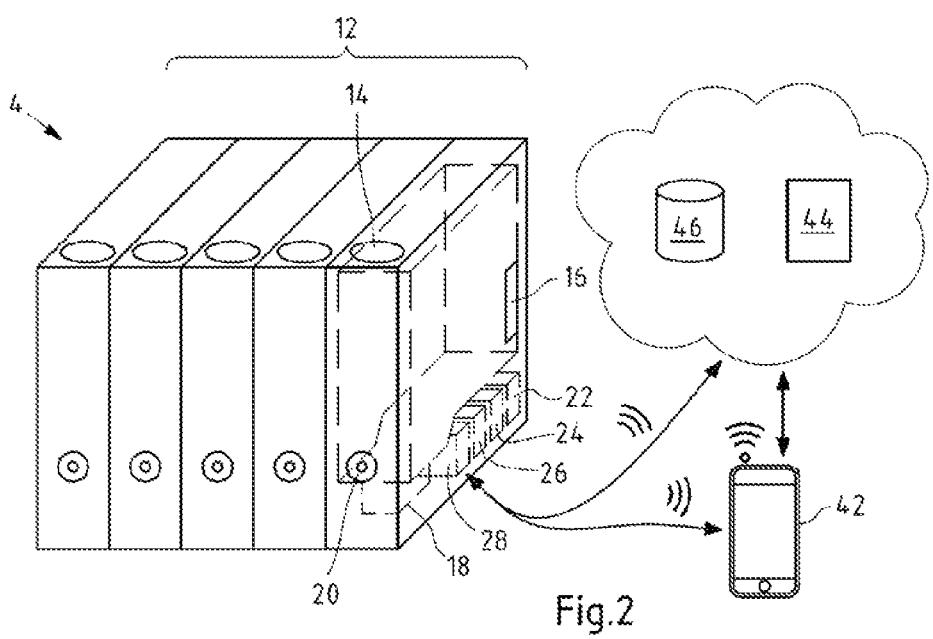
FIG. 2 shows the mobile dosing device of FIG. 1 in an enlarged view.

FIG. 2 shows the mobile dosing device of FIG. 1 in an enlarged view, in which the various dosage chambers 12 are formed in a structural unit. The dosage chambers 12 have their own refill openings 14 and each have their own fill level sensor 16. The interior of each dosage chamber 12 is connected in each case to an electrical valve 20 via a control line 18.

It is understood that the dosage chambers 12 must also be equipped with the corresponding control electronics (not explicitly shown here) in order to be able to ensure a corresponding dosage of the cleaning agents.

Furthermore, the dosing device 4 is equipped with a communication unit 28 comprising a communication interface in order to be able to conduct the necessary communication with other components of the dosing device 4, such as the control unit 22, in particular regarding the fill levels of the cleaning agents and the receipt of the dosing instructions.

In addition to the possibility of communication with the internal components of the dosing device 4, the dosing device 4 is also capable of communication with a user 48 via an interface of the communication unit 28, which may be formed as a wireless communication interface. A user 48 can communicate with the dosing device 4, for example, by employing a user terminal 42, for example by employing a computer, tablet or smart phone. A connection can be made, for example, via Bluetooth, WLAN, or via mobile radio.

In addition to communication with a user 48, the communication interface, which may be formed as a wireless interface, also allows a communication of the dosing device 4 with an externally arranged memory 46, which can be reached via a connection to a cloud. In this case, a communication with the externally arranged memory 46 can be carried out either directly or indirectly via a user terminal 42.

In addition to an indirect connection to the cloud via a user terminal 42, a connection to the cloud can also be made indirectly via an Internet service 44.

Alternatively or in combination for storing data on an external memory 46, an internal memory can also be present in the dosing device 4 in which data can be stored.

In addition to a communication unit 28 and a control unit 22, the dosing device 4 further has a sensor unit 24 for detecting measured variables and an autonomous power supply 26 in the form of exchangeable batteries or in the form of an autonomous energy conversion system.

Alternatively, the dosing device 4 can also be supplied with power via the power supply of the dishwasher 2.

The dosing device 4 according to FIG. 2 has a total of five dosage chambers 12, but it goes without saying that also more or less dosage chambers 12 can be arranged, which also need not be formed in a structural unit.

In addition to the dosage of rinsing agent, the dosing device 4 shown is also suitable for an optimized introduction of different substances, such as rinse aid, water softener, dishwasher salt in liquid form or dishwasher cleaners and the like. The individual substances are then filled into the different dosage chambers 12 of the dosing device 4. If necessary, the respective substance is then introduced into the treatment space by the electrical valve 20 in the respective amount determined by the control unit 22.

Each dosage chamber 12 has fill level sensors 16 which measure the state and the available amount of the respective substance and forward these to the control unit 22, which gives an indication to the user 48 for refilling or reordering as needed.

Figure 3:
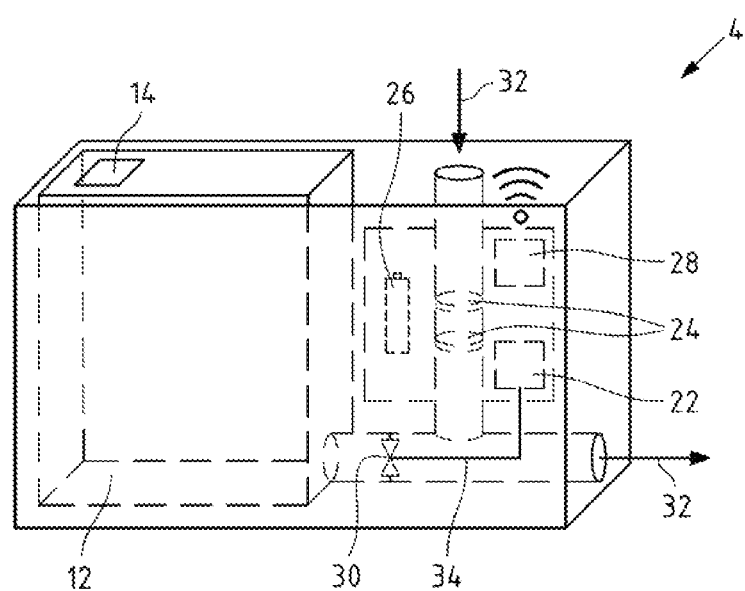
FIG. 3 shows a mobile dosing device for the automatic dosing of cleaning agents according to a second embodiment in an enlarged view.

FIG. 3 shows a mobile dosing device 4 for the automatic dosing of cleaning agents for placement in the dispensing chamber 36 of a washing machine 2' in an enlarged view.

The dosing device 4 has a cleaning agent chamber 12 and a refilling opening 14 for filling the cleaning agent chamber 12 with cleaning agent. The dosing device 4 is connected to the water line 32 via the electric valve 30, so that the addition of cleaning agent can be carried out electronically controlled via the valve 30. The control is carried out in this case via the control unit 22, which is connected to the electric valve 30 via a control line 34.

The water of the washing machine 2' which flows in from above into the water line 32 within a washing cycle can be analyzed by sensors 24, for example, viscosity and turbidity sensors, arranged in the water line 32, whereby there can be a conclusion about a current soiling state of the items to be cleaned placed in the washing drum.

The mobile dosing device 4 also has an autonomous power supply 26 in the form of batteries or accumulators and a communication unit 28 configured for wireless communication via Bluetooth or WLAN with any other sensors, a user 48 via a user terminal 42 and with an external memory 46.

It is understood that the execution of a mobile dosing device 4 can vary in dimension and shape depending on the type of cleaning machine. For example, the dosing device 4 can also be formed from a plurality of chambers 12, which have individual refill openings 14 and are connected to the water line 32 via individual feed devices and electrical valves 30. The individual valves 30 are advantageously connected in this case via individual control lines 34 to the control unit 28, so that a separate dosing of different cleaning agents can be carried out depending on the determined soiling state of the items to be cleaned, controlled by the mobile dosing device 4.

Figure 4:
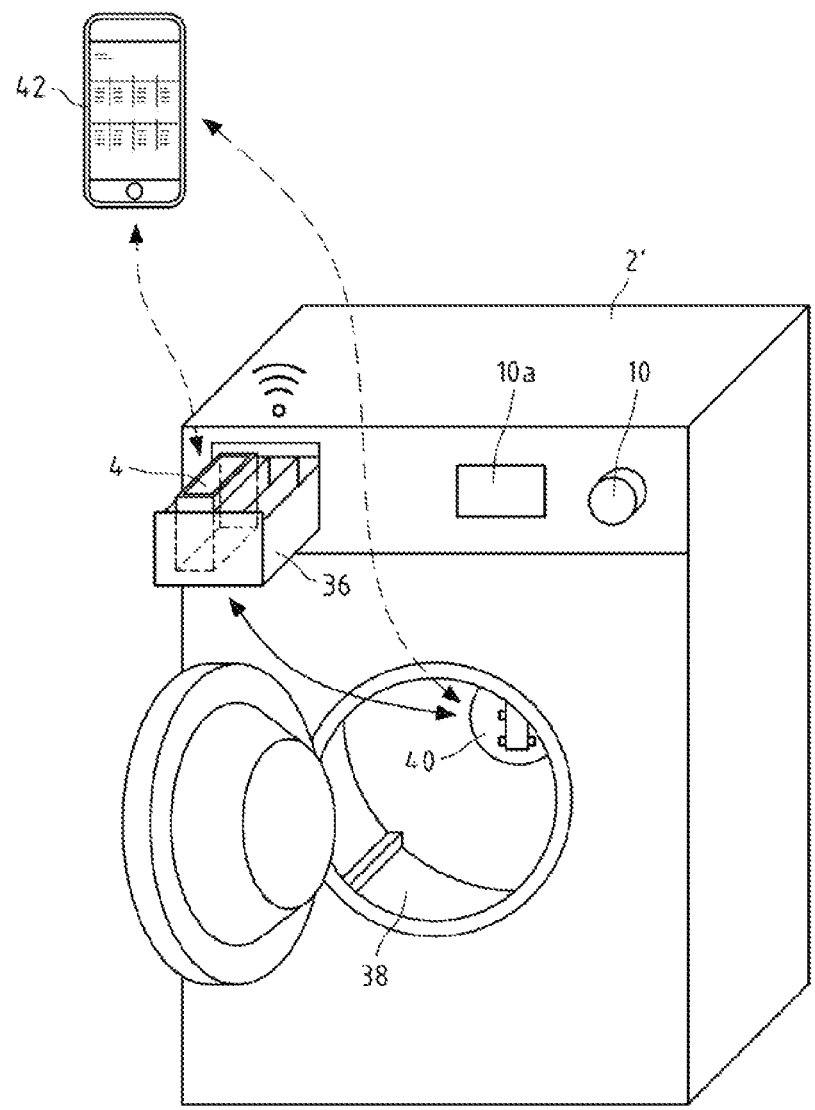
FIG. 4 shows the mobile dosing device of FIG. 3, arranged in the dispensing chamber of a washing machine, connected to a user terminal.

FIG. 4 shows the mobile dosing device 4 of FIG. 3 arranged in the dispensing chamber 36 of a washing machine 2' and connected to a user terminal 42.

In addition to the sensors 24 arranged in the dosing device 4, further sensors 40 for detecting measured data are arranged on the rear side of the drum 28 with the goal of determining an operating state of the washing machine 2'.

In order to be able to determine the operating state of a cleaning machine, as shown here, washing machine 2', as accurately as possible when using a universally applicable dosing device 4, it has been recognized that it is advantageous, in addition to the measured values detected by sensors 24, 40, to know control information items, in particular concerning the program structure of the respective cleaning machine. The control information items can be made available, for example, by a user 48 himself, as according to the embodiment shown in FIG. 4, via a smart phone in order to be able to determine the dosing times optimal for a cleaning operation as accurately as possible, so that an improved cleaning result can be achieved.

Figure 5:
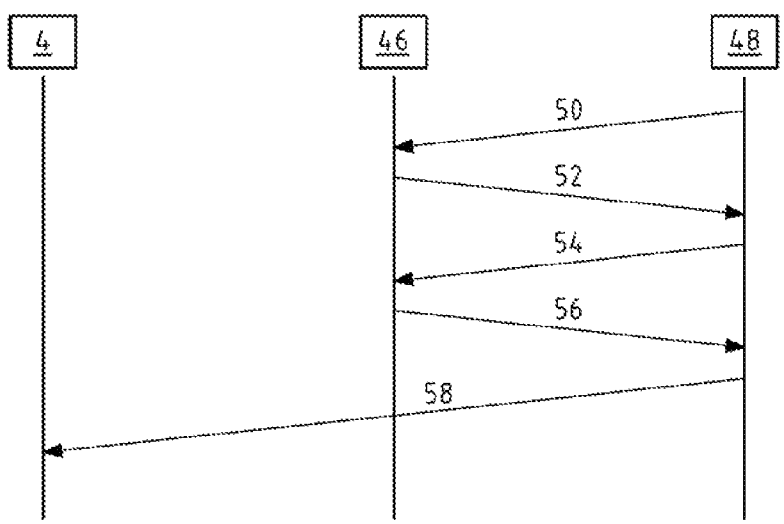
FIG. 5 shows a flow chart illustrating an exemplary operation for receiving control information items.

FIG. 5 shows a flow chart for illustrating an exemplary operation for receiving control information items, in which a user 48 initially via a user interface with the aid of a user terminal 42, for example, with the aid of his smart phone or tablet, via a corresponding application, sends a request 50 for providing a data table stored on the memory 46 to the memory 46.

After an optional authentication of the user 48, which may be integrated in the request 50, the memory 46 provides the user 48 with the desired data in step 52 via the user interface. These information items may be provided to the user 48 in tabular form, for example in the form of a table comprising a variety of types of cleaning machines, from which the user 48 can select his cleaning machine.

After the appropriate selection, the user 48 transfers his choice to the memory 46 via the user interface in step 54.

Based on the cleaning machine selected by the user 48, the memory 46 selects the control information items suitable for the cleaning machine in step 56 and transmits these to the user 48 in step 56. For this purpose, separate control information items need not necessarily be stored in the memory 46 for each type of cleaning machine; the same control information items can also be stored for different types of cleaning machines. Universal control information items can also be stored in the memory 46, which control information items are transmitted when a corresponding type of cleaning machine can not be found.

In step 58, the control information items are finally sent by the user 48 via a user terminal 42 to the dosing device 4, which uses the control information items to be able to better determine the individual operating states of a cleaning operation of a cleaning machine, so as to finally achieve a more accurate dosing of the cleaning agent and thus a suitable cleaning result.

As an alternative to the last two steps 56 and 58, in which the control information items suitable for the cleaning machine are first transmitted (56) from the memory 46 to the user 48 before the user 48 forwards (58) the information items to the dosing device 4, the suitable control information items are also transmitted from the memory 46 directly to the dosing device 4.

As an alternative to the user 48 making contact with the memory 46 via an application of a user terminal 42, a user terminal 42 located in the vicinity of the dosing device 4 can also be recognized by the dosing device 4, whereupon the user 48 receives information items about the address of the memory 46 via the user terminal 42 or is connected directly to the memory 46 via the dosing device 4.

FIG. 6*a* shows an example of a first level of a selection table for selecting a machine type of a cleaning machine according to a first embodiment, in which different types of cleaning machines are sorted by manufacturer.

The table shown in FIG. 6*a* has a purely exemplary and by no means limiting character and shows washing machines, dryers, dishwashers and finishers of the companies ABC, DEF, GHI, JKL as possible selectable cleaning machines.

On the basis of these sorting criteria, the different types of the respective cleaning machine of the corresponding manufacturer are now located in a column sorted according to a manufacturer-specific specification, for example, according to the first four digits of the serial numbers of the respective device.

Alternatively, instead of sorting on the basis of the serial number, a sorting can also be carried out on the basis of other manufacturer-specific specifications, such as the type number, the model number, the product number and the like. For example, the first four digits of the serial numbers of four cleaning machines are shown in the first table of the manufacturer ABC, which is by no means to be understood as exhaustive.

Because a selection of the respective cleaning machine only by employing the serial number is inconvenient and confusing for a while, it is proposed that the user 48 has the option of viewing the listed data in a second level on the basis of other sorting criteria.

In the embodiment shown according to FIG. 6*a*, the user 48 marks, for example, the field "washing machines" concerning cleaning machines of the company ABC in Table 1, since the user 48 can very easily recognize this information item at a first glance at the cleaning machine. The user 48 thus arrives in the exemplary second level of the selection table shown in FIG. 6*b* by selecting the field "washing machines" from ABC.

FIG. 6*b* now shows a table with washing machines of the company ABC sorted by various device-specific identifiers clearly marked based on the first four digits of the serial number.

In the table of FIG. 6*b*, the user 48 can select his respective device, for example, based on the device-specific identifier, whether it is a washing machine formed as a front loader or top loader, based on the energy efficiency class, based on the maximum achievable number of revolutions of the washing drum, based on the filling amount or the like. This is suitable when the user 48 does not find the serial number of the device or can not uniquely identify it due to the numerous other identifiers on the nameplate.

Advantageously, the serial number of a cleaning machine can thereby be determined by further trimming a variety of device-specific specifications in several sub-levels, although the user 48 does not know the serial number of the device. Thus, the tables can be designed such that a user 48 is able, for example, to select the serial number of a washing machine based on the specifications as to whether the washing machine is formed as a front loader or as a top loader and which energy efficiency class, which maximum achievable number of revolutions and what filling amount it has.

FIG. 7*a* shows an example of a first level of a selection table for selecting a machine type of a cleaning machine according to a second embodiment, in which different manufacturers of cleaning machines are sorted according to type of cleaning machines. The table shown in FIG. 7*a* to be understood as purely by way of example shows washing machines, dryers, dishwashers and finishers of the companies ABC, DEF, GHI, JKL as possible selectable manufacturers of cleaning machines.

On the basis of these sorting criteria corresponding to the table shown in FIG. 6*a*, the different types of the respective cleaning machine of the corresponding manufacturer can be found in a column sorted according to a manufacturer-specific specification, for example, according to the first four digits of the serial numbers of the respective device, on the basis of which a selection of the respective cleaning machine is carried out.

Figures 7B, 8:
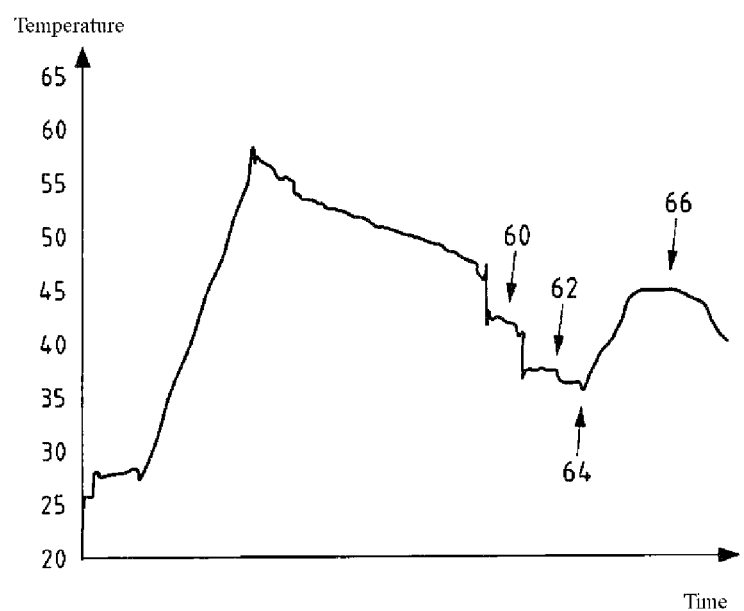
FIG. 7b shows the table of FIG. 7a in a second level.
FIG. 8 shows plotting of the internal temperature of a dishwasher against time to illustrate an adaptive process in a dishwasher.

In the embodiment shown in FIG. 7*a*, the user 48 marks, for example, the field with the first four digits of the serial number "3220- . . . " in the Table 1 relating to washing machines of the company ABC. The user 48 thus reaches the exemplary second level of the selection table shown in FIG. 7*b* by selecting the field of the serial number "3220- . . . " of the company ABC.

FIG. 7*b* now shows a table with washing machines from the company ABC starting with the digits "3220-" sorted based on the full serial number, in which user 48 can uniquely select his respective cleaning machine.

As can be seen from the table of FIG. 7*b*, unique control information items are assigned to each cleaning machine, which can be arranged in the table of FIG. 7*b* correspondingly directly next to the respective complete serial number and can be selected. Each serial number need not be necessarily assigned a different control information item. In some cases, it is also possible that different yet very similar cleaning machines have the same control information items.

Finally, FIG. 8 shows a plot of the internal temperature of a dishwasher 2 against time to illustrate an adaptive process in a dishwasher 2.

Modern dishwashers 2 nowadays often have a drying system based on a zeolitic drying unit in which the vapor-saturated vapors are forced or sucked by employing a fan over a bed of zeolite material and the zeolite absorbs the water contained in the air in an exothermic process. The exhaust air of the drying unit, which is strongly heated by the exothermic process, is led back into the treatment space of the dishwasher 2, where it heats the dishes and, now as dry air, absorbs water again, so that a cycle process occurs which only ends when no more water evaporates in the treatment space, so the dishes are dried. Due to the exothermicity of the adsorption process, it is no longer necessary to heat the dishes for drying in the rinse cycle, whereby the heating of the rinse water is eliminated and the energy balance of the device turns out much more positive.

This process is only run through when the reservoir of the rinse aid is filled in the machine's own dispenser. If this is not the case, for example, when the user 48 uses a multi-functional dishwashing product with integrated rinse aid, the rinse water is additionally heated in the rinse cycle and additional energy for the drying is thus introduced into the system.

In the present case, it is now proposed that the mobile dosing device 4 determines information items regarding the temporal course of the water presence and the temperature in a treatment space of a dishwasher 2 in order to determine an optimal dosing time therefrom.

The communication-capable, automatic dosing device 4 is either itself able to evaluate the data, or it sends the determined data, in this example, the temperature profile with information items about the current water presence, to a remote location, for example, a cloud application that is able to analyze the data and, if necessary, discover special features or anomalies.

Thus, the algorithm which examines the temperature profile discovers that a water change (water absence and temperature drop) occurs after the intermediate rinse 60, and there is a subsequent unheated rinse cycle 62 (no positive temperature change over time).

The conclusion in ignorance of the type of machine is that it must be a machine with zeolite drying, since no heating has occurred in the rinse cycle.

Now, a feedback to the automatic dosing device 4 can be carried out in which it is located in a machine having zeolite drying, whereupon, based on the data analysis, the program sequence on the dosing device 4 is adjusted and no heating is carried out during the rinsing operation, so that the temperature drops up to the end of the rinse cycle 64, in order to be heated in an energy-saving manner in the course of the zeolite drying 66. The result is an improved clear drying performance.

The program sequence can be changed after a single analysis of the data or after analyzing multiple runs. A continuous analysis of the temperature data ensures that the decision once made still applies or needs to be corrected.

The embodiments of the present disclosure described in this specification and the respective optional features and properties cited in this context should also be understood as disclosing all combinations with one another. In particular, the description of a feature encompassed by an embodiment is, unless explicitly explained to the contrary, not to be understood in this case as meaning that the feature is necessary or essential for the function of the embodiment. The sequence of the method steps described in this specification in the individual flowcharts is not mandatory, alternative sequences of the method steps are conceivable. The method steps can be implemented in various ways, so an implementation in software (by program instructions), hardware, or a combination of both to implement the method steps is conceivable.

Terms used in the patent claims, such as "comprising", "having", "including", "containing" and the like, do not exclude further elements or steps. The expression "at least partially" includes both the "partial" and "full" cases. The expression "and/or" should be understood as meaning that both the alternative and the combination should be disclosed, that is, "A and/or B" means "(A) or (B) or (A and B)". The use of the indefinite article does not exclude a plurality. A single device can perform the functions of several units or devices mentioned in the patent claims. Reference signs indicated in the patent claims should not be regarded as limitations on the means and steps employed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method for dosing of cleaning agent in cleaning machines comprising the steps:
    receiving control information items, wherein the control information items are dependent on an information item about a cleaning machine;
    determining progress of a cleaning operation;
    dosing the cleaning agent depending on the received control information items and the progress of the cleaning operation;
    wherein the information item about the cleaning machine is manually received via a user interface;
    wherein the information item about the cleaning machine comprises a brand name of the cleaning machine;
    wherein a user profile is created based on measured values detected during a cleaning operation and the received control information items, wherein the user profile is stored on a nonvolatile memory arranged on the dosing device, and wherein the user profile is generated based on a user input provided by the user via the user interface as to a type of the user's cleaning machine;
    wherein the measured variables detected during the cleaning operation and received control information items are analyzed and extended using a machine learning system comprising a processor of a dosing device; and
    wherein the processor of the dosing device utilizes an autonomous, self-learning algorithm, which over time uses the information items prepared by the dosing device and related to individual washing operation of the cleaning machine, and the information items are additionally accessible from a memory or stored in a user profile, to learn a decision-making about an appropriate time and addition of suitable different cleaning substances in order to perform a cleaning optimized to circumstances pertaining to usage of the cleaning machine.

2. The method according to claim 1,
    wherein the control information items comprise information items about a program structure of the cleaning machine.

3. The method according to claim 1,
    wherein the information item about the cleaning machine further comprises a construction type of the cleaning machine.

4. The method according to claim 1,
    wherein the method is implemented via a dosing device, and the control information items are stored in a memory comprising an external memory remote from the dosing device.

5. The method according to claim 4,
    wherein a user for determining the control information items receives at least one destination address of the memory and is automatically connected to the destination address of the memory.

6. The method according to claim 4,
    wherein the control information items are transmitted directly from the memory to the dosing device.

7. The method according to claim 1,
    further comprising after receiving the control information items, matching real determined data with data stored in the memory for corresponding control information items.

8. A mobile dosing device for automatically dosing cleaning agents in a cleaning machine comprising:
- at least one dosage chamber;
- at least one sensor unit configured for the detection of measured variables;
- at least one control unit configured to control the mobile dosing device;
- at least one communication unit configured to receive control information items,
- wherein the control information items are dependent on an information item about the cleaning machine that is manually input via a user interface;
- wherein the dosing device is configured such that a dosed supply of cleaning agent is provided depending on the received control information items and a determined progress of the cleaning operation;
- wherein the control unit of the mobile dosing device comprises a processor that utilizes an autonomous, self-learning algorithm, which over time uses the information items prepared by the dosing device and related to individual washing operation of the cleaning machine, and the information items are additionally accessible from a memory or stored in a user profile, to learn a decision-making about an appropriate time and addition of suitable different cleaning substances in order to perform a cleaning optimized to circumstances pertaining to usage of the cleaning machine;
- wherein the user profile is created based on measured values detected during a cleaning operation and the received control information items, wherein the user profile is stored on a nonvolatile memory arranged on the dosing device, and wherein the user profile is generated based on a user input provided by the user via the user interface as to a type of the user's cleaning machine;
- wherein the measured variables detected during the cleaning operation and received control information items are analyzed and extended using a machine learning system comprising a processor of a dosing device; and
- wherein the processor of the dosing device utilizes an autonomous, self-learning algorithm, which over time uses the information items prepared by the dosing device and related to individual washing operation of the cleaning machine, and the information items are additionally accessible from a memory or stored in a user profile, to learn a decision-making about an appropriate time and addition of suitable different cleaning substances in order to perform a cleaning optimized to circumstances pertaining to usage of the cleaning machine.

9. The mobile dosing device according to claim 8,
wherein the at least one sensor unit has at least one sensor for detecting a state of a cleaning fluid selected from the group consisting of: viscosity, turbidity, pollen load, water hardness, color rinse, pH value, and odor.

10. The mobile dosing device according to claim 8,
wherein the communication unit is a wireless communication unit configured for wireless communication with other cleaning machines, for communication with portable user terminals, or for communication with further components of a private or public network.

11. The mobile dosing device according to claim 8,
wherein the dosing device has a plurality of dosing chambers formed as a structural unit or at least one electrical valve with associated control electronics.

12. The mobile dosing device according to claim 8,
wherein the dosing device comprises an autonomous energy conversion system, mobile power supply units, or a device for inductive and contactless transmission of electrical energy.

13. The method of claim 8, wherein the processor is further configured to learn decision-making about the appropriate time and addition of suitable different cleaning substances in order to perform the cleaning optimized to circumstances pertaining to usage of the cleaning machine, including energy usage by the cleaning machine.

14. The method of claim 8, wherein the processor is further configured to learn decision-making about the appropriate time and addition of suitable different cleaning substances in order to perform the cleaning optimized to circumstances pertaining to usage of the cleaning machine, including cleaning by the cleaning machine.

15. The method of claim 8, wherein the processor is further configured to learn decision-making about the appropriate time and addition of suitable different cleaning substances in order to perform the cleaning optimized to circumstances pertaining to usage of the cleaning machine, including noise generated by the cleaning machine.

16. The method of claim 8, wherein the processor is further configured to learn decision-making about the appropriate time and addition of suitable different cleaning substances in order to perform the cleaning optimized to circumstances pertaining to usage of the cleaning machine, including each of the following: namely, energy usage, cleaning, and noise generated by the cleaning machine.

17. A method for dosing of cleaning agent in cleaning machines comprising the steps:
- receiving control information items, wherein the control information items are dependent on an information item about a cleaning machine;
- determining progress of a cleaning operation;
- dosing the cleaning agent depending on the received control information items and the progress of the cleaning operation;
- wherein the information item about the cleaning machine is manually received via a user interface;
- wherein a user profile is created based on measured values detected during a cleaning operation and the received control information items, wherein the user profile is stored on a nonvolatile memory arranged on the dosing device, and wherein the user profile is generated based on a user input provided by the user via the user interface as to a type of the user's cleaning machine;
- wherein the measured variables detected during the cleaning operation and received control information items are analyzed and extended using a machine learning system comprising a processor of a dosing device; and
- wherein the processor of the dosing device utilizes an autonomous, self-learning algorithm, which over time uses the information items prepared by the dosing device and related to individual washing operation of the cleaning machine, and the information items are additionally accessible from a memory or stored in a user profile, to learn a decision-making about an appropriate time and addition of suitable different cleaning substances in order to perform a cleaning optimized to circumstances pertaining to usage of the cleaning machine.

18. The method of claim 17, further comprising:
- receiving a first input from the user via the user interface;
- providing a table for the user via the user interface, the table comprising a number of different types of cleaning machines; and receiving a second input from the user via the interface, the second input comprising the user input as to the type of the user's cleaning machine, as selected by the user from the table.

\* \* \* \* \*